Reissued June 14, 1927. Re. 16,652

UNITED STATES PATENT OFFICE.

HARRY M. NAUGLE AND ARTHUR J. TOWNSEND, OF CANTON, OHIO, ASSIGNORS TO FORGED STEEL WHEEL COMPANY, OF PITTSBURGH, PENNSYLVANIA, A CORPORATION OF PENNSYLVANIA.

METHOD OF MAKING STRIP SHEETS.

No Drawing. Original No. 1,536,028, dated April 28, 1925, Serial No. 583,612, filed August 22, 1922. Application for reissue filed April 25, 1927. Serial No. 186,559.

The invention relates to the production of metal strip sheets, for use in making deep drawn or formed products; and the object of the improvement is to give the sheets the necessary high ductility required for the drawing or forming operations, by a simple, direct, effective and economical method.

It is desirable, if not necessary, to make such strip sheets from an ordinary strip, skelp or bar, by a longitudinal rolling operation. A hot rolling reduction does not produce the necessary or desirable quality, surface, or accuracy to gauge; while a cold rolling operation has heretofore only been used to reduce the material to about one-third of its original thickness, without an intermediate annealing.

The present method involves the production of a strip sheet having high ductility, as well as the desired quality, surface and accuracy to gauge, for the purpose intended, by first reducing the material rapidly, by a small number of heavy drafts or passes between cold rolls, to say half or less than half of the original thickness of the metal followed by a quick annealing of the individual strip sheets which have been rapidly reduced by the cold rolling operation.

A readjustment of the grains to relieve them of the strains produced by the rapid cold rolling reduction, cannot be accomplished by the ordinary box annealing of a mass of material, for the reason that the long period of time required to properly heat the inner portions of the mass, not only results in an over-annealing of the outer portion thereof, but in the production of a grain growth in a considerable portion of the mass, which destroys the ductility, and the uniformity, and also decreases the strength of the material in the outer portion of the charge.

An open or a continuous method of quickly annealing individual sheets, however, not only prevents a growth of the grains, but accomplishes a readjustment of the grains into a uniform structure with fine grains throughout, and gives to the strip sheet the necessary high ductility, in addition to the desired quality, surface and accuracy of gauge, which has been given to them by the cold rolling reduction. The best results have been obtained by an open annealing of individual sheets at a temperature of from 1200° to 1400° F., preferably 1300° F., in a cycle of forty minutes or less. When, however, a very thin strip is annealed by passing it continuously through a heating tube or tunnel, a much higher temperature may be employed and the time may be shortened to as low as a cycle of five minutes.

It will be understod that steel strips are usually one-fourth of an inch or under in thickness, that skelp runs from one-sixteenth to three-eighths of an inch in thickness, and that bars run from one-fourth of an inch and upward in thickness; and it has been found that the same can be reduced to from fifty to sixty per cent less than the original thickness by from four to ten passes between cold rolls, depending upon the original thickness of the material.

We claim:—

1. The method of making a strip sheet from a strip, skelp, bar or the like, which consists in rapidly reducing cold material to a strip sheet of less than half the original thickness, and then annealing the same by a continuous method.

2. The method of making a strip sheet, from a strip, skelp, bar or the like, which consists in rapidly reducing cold material to a strip sheet of less than half the original thickness, and then annealing the same in a short cycle.

3. The method of making a strip sheet from a strip, skelp, bar or the like, which consists in rapidly reducing cold material to a strip sheet of less than half the original thickness, and then annealing the same at a temperature of about 1300° F., in a short cycle.

4. The method of making a strip sheet from a strip, skelp, bar or the like, which consists in rapidly reducing the material by a small number of heavy drafts between cold rolls to a strip sheet of less than half the original thickness, and then annealing the sheet by a continuous method.

5. The method of making a strip sheet from a strip, skelp, bar or the like, which consists in rapidly reducing the material by a plurality of drafts between cold rolls and then annealing the sheet by a continuous method.

HARRY M. NAUGLE.
ARTHUR J. TOWNSEND.